United States Patent [19]

Walther et al.

[11] 4,243,269
[45] Jan. 6, 1981

[54] EDGE LUGGED TIRE CARRYING RIM AND WHEELS

[75] Inventors: William D. Walther, Kettering; Robert A. DeRegnaucourt, Bellbrook, both of Ohio

[73] Assignee: Dayton-Walther Corporation, Dayton, Ohio

[21] Appl. No.: 913,013

[22] Filed: Jun. 6, 1978

Related U.S. Application Data

[63] Continuation-in-part of Ser. No. 749,241, Dec. 13, 1976, abandoned, which is a continuation-in-part of Ser. No. 592,504, Jul. 9, 1975, abandoned.

[30] Foreign Application Priority Data

Dec. 12, 1977 [CA] Canada .................................. 292871

[51] Int. Cl.³ .............................................. B60B 23/10
[52] U.S. Cl. ............................. 301/12 R; 301/13 SM; 301/20
[58] Field of Search ................. 301/10 R, 11 R, 11 S, 301/12 R, 13 R, 13 SM, 18–20, 22, 96–97

[56] References Cited

U.S. PATENT DOCUMENTS

| 1,617,999 | 2/1927 | Forsyth | 301/19 |
| 1,792,807 | 2/1931 | Brunner | 301/12 R X |
| 2,010,238 | 8/1935 | Keller | 301/12 R |
| 2,270,918 | 1/1942 | Ash | 301/13 R |
| 2,623,792 | 12/1952 | Mills | 301/13 SM |
| 2,633,388 | 3/1953 | Woodward | 301/12 R |
| 2,767,026 | 10/1956 | Walther, Sr. | 301/13 SM |

FOREIGN PATENT DOCUMENTS

| 1480846 | 4/1969 | Fed. Rep. of Germany | 152/398 |
| 455919 | 3/1950 | Italy | 301/23 |
| 1049337 | 11/1966 | United Kingdom | 301/12 R |

*Primary Examiner*—Charles A. Marmor
*Attorney, Agent, or Firm*—Mack D. Cook, II

[57] ABSTRACT

Tire carrying rims seated and locked on vehicle wheels by fastening assemblies. A wheel has spoke members with dimensioned felloe surfaces for mating engagement with a radially inclined surface on a rim base edge portion and for coaction with a series of clamp lugs having radially inwardly directed leg portions and being integrally secured to a radially directed axially outer rim base surface. Rims may be dual mounted in mating, seating or full surface engagement with coacting felloe surfaces of the rim and wheel by full tightening of the fastening assemblies.

3 Claims, 5 Drawing Figures

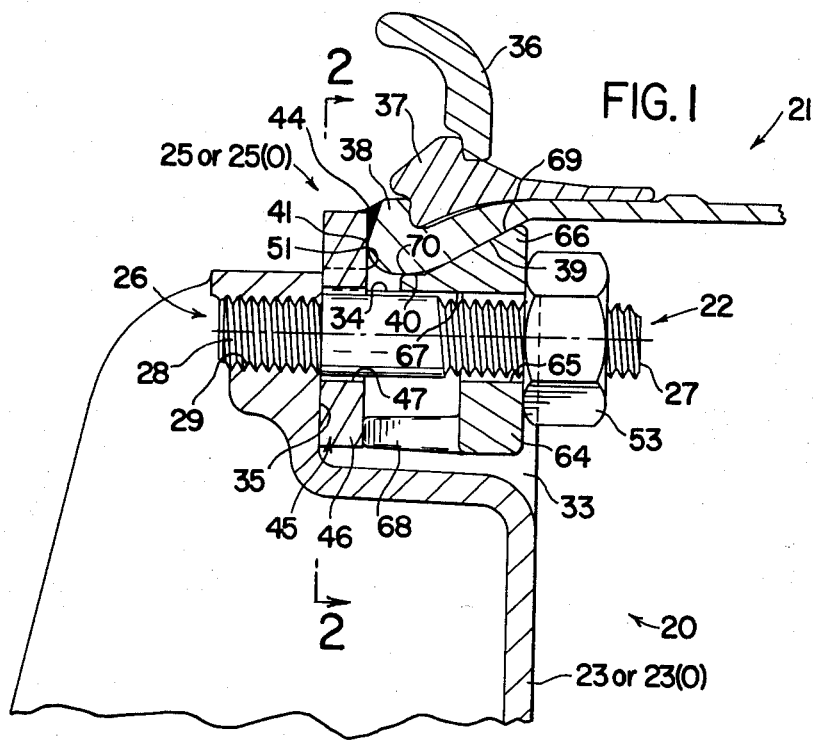
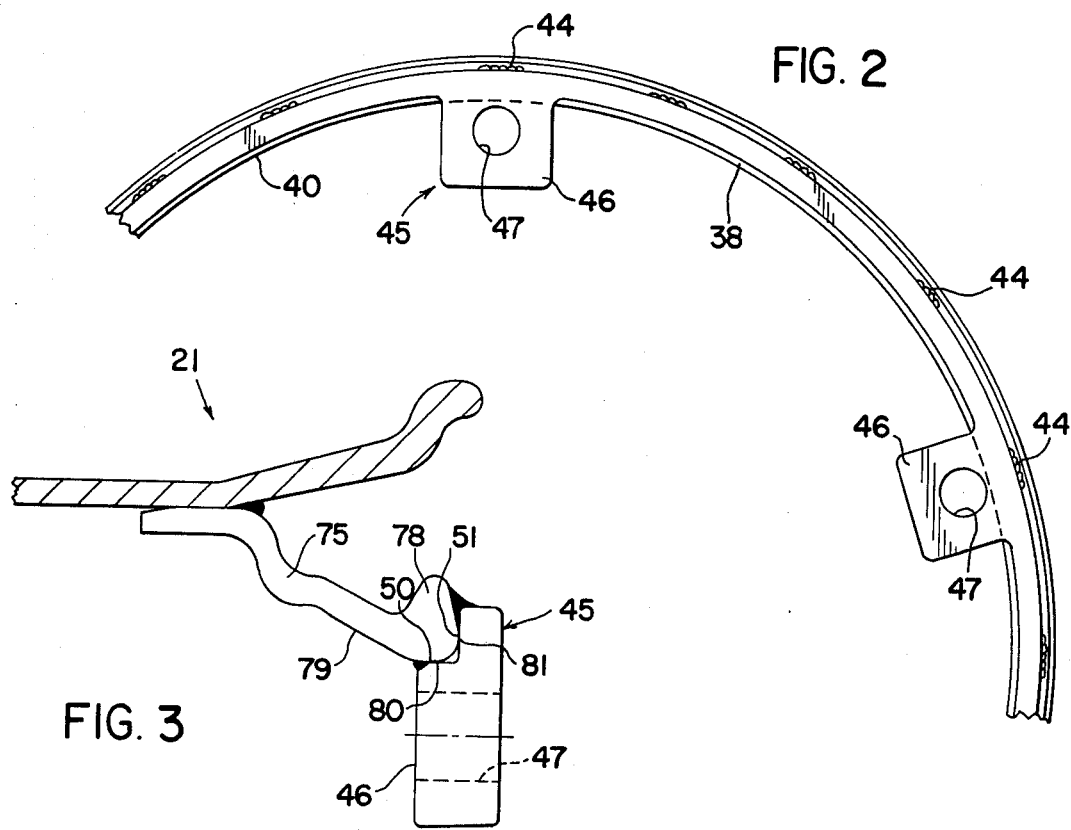

EDGE LUGGED TIRE CARRYING RIM AND WHEELS

This application is a continuation-in-part of U.S. application Ser. No. 749,241, filed Dec. 13, 1976, now abandoned; which was a continuation-in-part of U.S. application Ser. No. 592,504, filed July 9, 1975, also now abandoned.

BACKGROUND OF THE INVENTION

The present invention relates to a combination of dual inner and outer tire carrying rims mounted on a vehicle wheel without using a separating means such as an annular spacer.

The inner spoke members of a dual wheel have a felloe comprising or having thereon a conical outwardly facing surface tapering toward a radially directed axially facing surface.

The outer spoke members of a dual wheel have a felloe comprising or having thereon a segment of a radially directed axially facing surface which extends inwardly between radially outer dual axially oriented surfaces defining segments of a cylindrical outwardly facing surface.

A rim, whether mounted as an inner dual or outer dual, may be of an identical and, therefore, interchangeable construction. The rims have a rim base edge portion with a radially inclined surface defining an annular conical inwardly facing surface intersecting a radially inner surface intersecting an axially outer surface and a plurality of clamp lugs integrally secured to the axially outer surface. Each clamp lug has a radially inwardly directed leg portion defining a segment of an axially facing surface.

The accurate mounting of tire carrying rims on the felloe, felly or load-bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies were torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies could lead to relative displacement or non-alignment of the assembly components during fastening, creating conditions of what are now commonly referred to as excessive lateral (axial) or radial runout, or an imbalance of the tire-rim-wheel assembly during vehicle operation.

The concepts of the invention provide wheel spoke members with proportioned or dimensioned felloe surfaces for mating, seating or full surface engagement with coacting surfaces on the rim base edge portion and clamp lug leg portions by full tightening of the fastening assemblies.

An edge lugged rim and fastening assemblies therefor according to the invention, when used with wheels adapted thereto, positively controls and reduces lateral (axial) and radial runout, resists rim warpage or deformation, restricts or locks out the possibility of rim rotation relative to the wheel and provides better balance for the tire-rim-wheel assembly during vehicle operation.

SUMMARY OF THE INVENTION

The object of the invention is to provide an improved combination of dual tire carrying rims seated and locked by fastening assemblies on a vehicle wheel.

It is a further object of the invention to provide rims having a rim base edge portion with a radially inclined surface defining an annular conical inwardly facing surface intersecting a radially inner surface intersecting an axially outer surface and a plurality of clamp lugs integrally secured to the axially outer surface, each clamp lug having a radially inwardly directed leg portion defining a segment of an axially facing surface, which are mounted on the spoke members of a wheel having coacting felloe surfaces by the full tightening of fastening assemblies.

It is a further object of the invention to provide a combination of dual tire carrying rims seated and locked by fastening assemblies on a vehicle wheel which positively controls and reduces lateral (axial) and radial runout, resists rim warpage or deformation, restricts rim rotation relative to the wheel and provides better balance for the tire-rim-wheel assembly during operation.

These and other objects of the invention, as well as the advantages thereof, will be apparent in view of the detailed description of the various embodiments thereof as set forth below.

In general, an improved dual wheel according to the invention has a plurality of inner and outer spoke members. Each of the inner spoke members has a felloe comprising a radially inclined outer surface defining a segment of a conical outwardly facing surface tapering toward an adjacent radially directed surface extending inwardly and defining a segment of an axially facing surface oriented substantially perpendicular to the rotational axis of said wheel and providing a mounting location for an axially projecting component of a fastening assembly or means. Each of the outer spoke members has a felloe comprising a radially directed surface oriented in a plane substantially perpendicular to the rotational axis of the wheel and providing a mounting location for an axially projecting component of a fastening assembly. The outer wheel felloes may also have radially outer spaced-apart axially projecting wing portions providing outwardly facing dual axially oriented surfaces extending transversely of a radially directed wheel felloe surface.

In general, a tire carrying rim according to the invention has a rim base edge portion with a radially inclined axially inner surface defining an annular conical inwardly facing surface intersecting a radially inner surface intersecting an axially outer surface. A plurality of clamp lugs are integrally secured to the axially outer surface. Each clamp lug has a radially inwardly directed leg portion defining a segment of an axially facing surface oriented substantially perpendicular to the rotational axis of the rim and having a bore therethrough for receiving an axially projecting component of a fastening assembly.

In general, each fastening assembly for mounting an inner dual rim will comprise a threaded fastener having a rotatable element for bearing engagement against the leg portion of each clamp lug.

In general, each fastening assembly for mounting an outer dual rim will have a threaded fastener and a clamp element and a rotatable element supported thereon. The rotatable element is for bearing engagement against the clamp element. Each clamp element will have a radially outer portion with a radially inclined surface for mating engagement with a radially inclined surface on the rim base edge portion and lateral wing portions for mating engagement with outwardly facing felloe surfaces. A clamp element may also have an axially inwardly directed member for mating engagement with the leg portion of a clamp lug.

According to the invention, an outer dual tire carrying rim is seated on, and thereafter locked on, a wheel by initial and final tightening of fastening assemblies. During initial tightening of the fastening assemblies toward the clamp lug leg portions, the radially inclined rim base edge portion surface will seat in concentric radial registry with the radially inclined surfaces on the radially outer clamp element portions. The lateral wing clamp element portions are also in mating engagement with outwardly facing dual axially oriented wheel felloe surfaces. Final tightening of the fastening assemblies will lock the rim on the wheel, in axial and radial alignment and registry relative to the rotational axis of rim and wheel, by the full surface engagement of the clamp lug leg portions with radially directed wheel felloe surfaces.

DESCRIPTION OF THE DRAWINGS

FIG. 1 is a sectional view of a tire carrying rim seated and locked on the outer felloe of a dual wheel by a fastening assembly.

FIG. 2 is a detached fragmentary rear elevation on a reduced scale, taken substantially as indicated on line 2—2 of FIG. 1;

FIG. 3 is a sectional view of another form of tire carrying rim;

DETAILED DESCRIPTION OF THE INVENTION

Figure 4:
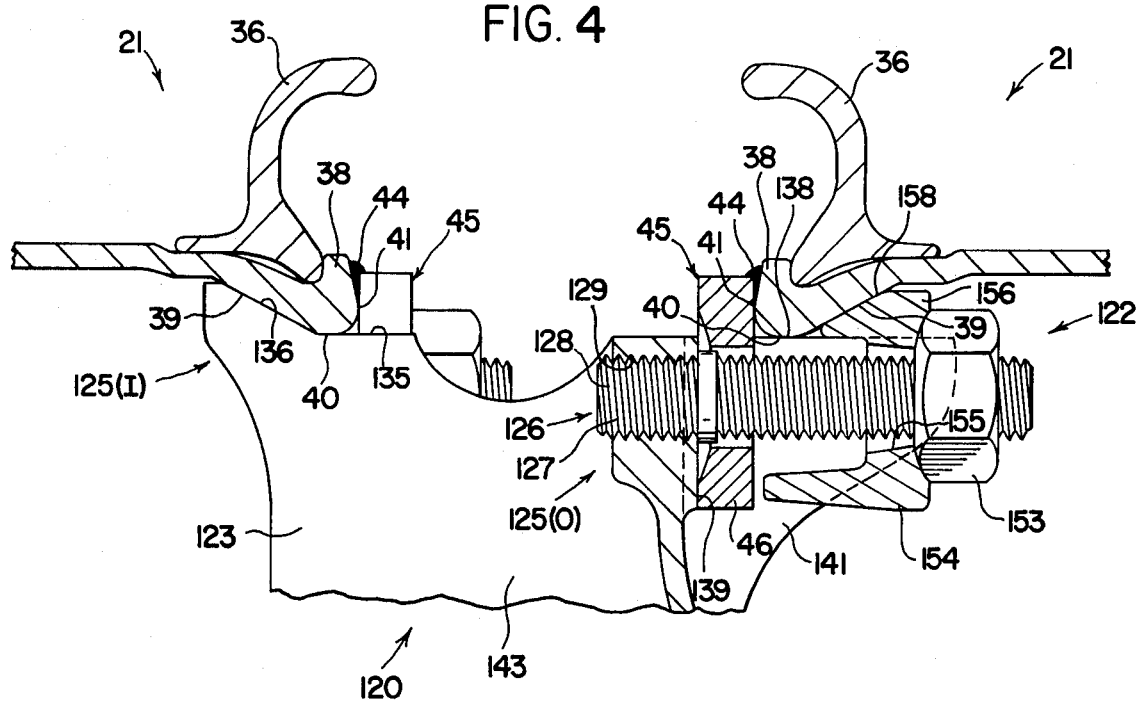
FIG. 4 is a fragmentary elevation of a dual wheel, broken away to show a tire carrying rim seated and locked on the outer felloe by a fastening assembly; and, FIG. 5 is a fragmentary elevation, companion to FIG. 4, broken away to show a tire carrying rim seated and locked on the inner felloe of the dual wheel by a fastening assembly.

A wheel for use with a tire carrying rim according to the invention is referred to generally by the numeral 20 or 120. A tire carrying rim according to the invention is referred to generally by the numeral 21. The fastening assemblies which are tightened for seating and locking of a rim 21 are referred to generally by the numeral 22 or 122.

Referring to FIG. 1, a wheel 20 for mounting a tire carrying rim 21 has a plurality of spaced-apart spoke members 23 extending radially from a conventional hub area (not shown) adapted for attachment of the wheel to a vehicle axle (not shown). The outer spoke members are more specifically indicated by 23(O).

Each spoke member 23 terminates in a felloe, felly or load-bearing portion referred to generally by the numeral 25. The outer felloes are more specifically indicated by 25(O).

Each wheel felloe 25 has a predetermined mounting location indicated generally at 26 for the axially projecting component of a fastening assembly 22. As shown, the axially projecting component of a fastening assembly 22 is an elongated stud 27 having an inner end with peripheral threads 28 for mating engagement with bore threads 29. Alternatively, the studs 27 may be attached to the felloe portions 25 as by a conventional arc stud or capacitor-discharge welds.

A wheel 20 has a felloe portion 25(O) with spaced-apart axially projecting wing portions 33 providing outwardly facing dual axially oriented surfaces 34 extending transversely of a radially directed surface 35. Each surface 35 defines a segment of an axially facing surface and extends inwardly between the axially oriented surfaces 34 substantially perpendicular to the rotational axis of a wheel 20 and has a mounting location 26 for the elongated stud 27 of a fastening assembly 22.

A tire carrying rim 21 has a fixed bead flange (not shown) and a removable bead flange 36 for seating the beads (not shown) of a tire in a conventional manner. As shown in FIG. 1 the removable bead flange 36 may have a transversely split lock ring 37. In all embodiments of a rim 21, the removable bead flange 36 is carried by an annular rim base edge portion 38.

The rim base edge portion 38 has a radially inclined axially inner surface 39 defining an annular conical inwardly facing surface. A surface 39 intersects an axially oriented radially inner surface 40 which intersects a radially directed axially outer surface 41.

A rim base edge portion 38 has securely attached or connected thereto, as by a weld 44, clamp lugs referred to generally by the numeral 45. The radially inwardly directed leg portion 46 of each clamp lug 45 defines the plane of a substantially continuous axially facing surface oriented substantially perpendicular to the rotational axis of a rim 21 and has a bore 47 for receiving the axially projecting component 27 or 127 of a fastening assembly 22 or 122.

Referring to FIG. 1, a clamp lug 45 having in cross section a generally rectangular shape is secured, as by a weld 44, to a conforming rim surface 41. As shown, the clamp lug leg portion 46 is locked against the surface 35 on a felloe portion 25 or 25(O) by a fastening assembly comprising an elongated stud 27, a clamp element 64 and a rotatable nut 53. A clamp element 64 has a bore 65 for receiving the stud 27. A clamp element 64 also has lateral wing portions 66 providing downwardly facing dual axially oriented surfaces 67 for seating on conforming wheel felloe surfaces 34. A clamp element 64 also preferably has an axially inwardly directed lower leg portion 68 for mating engagement against a clamp lug leg portion 46. The radially outer portion of a clamp element 64 has a radially inclined surface 69 intersecting an axially oriented surface 70 for mating engagement with conforming rim base edge portion surfaces 39 and 40.

Referring to FIG. 3, a clamp lug 45 may be used on a rim 21 having a radially inwardly projecting flange 75 carrying a rim base edge portion 78. The base portion 78 has a radially inclined axially inner surface 79 defining a conical inwardly facing surface. A surface 79 intersects an axially oriented radially inner surface 80 which intersects a radially directed axially outer surface 81. The conical inwardly facing surface 79 may conform to and be seated on a conforming surface of a felloe portion 25(I) or 25. Alternatively, the conical rim surface 79 may conform to and be seated on a radially inclined surface on a stud supported clamp element of a fastening assembly 22. A clamp lug 45 having an axially oriented surface 50 intersecting a radially directed surface 51 is securely attached to the conforming surfaces 80 and 81 on the rim base portion 78, as by welds 44.

Figure 5:
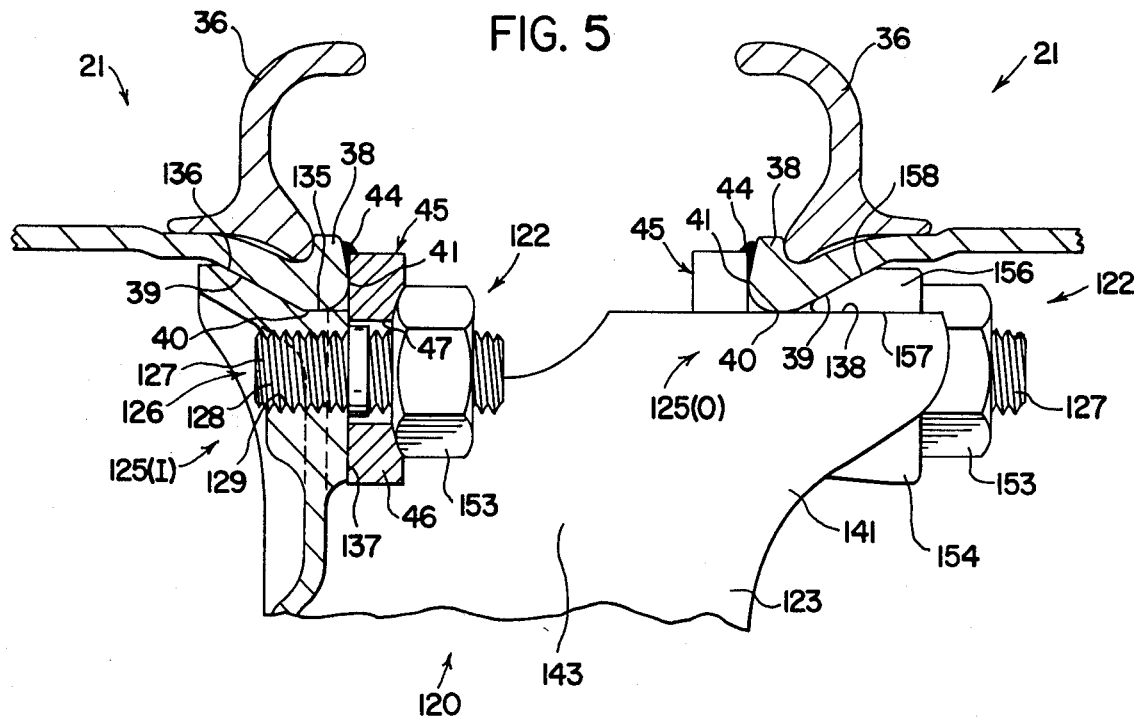

Referring to FIGS. 4 and 5, tire carrying rims 21 may be dual mounted on a vehicle wheel referred to generally by the numeral 120 using fastening assemblies referred to generally by the numeral 122.

A wheel 120 has a plurality of spoke members 123 extending radially from a conventional hub area (not shown) adapted for attachment of a wheel 120 to a vehicle axle (not shown).

Each spoke member 123 terminates in a felloe portion referred to generally by the numeral 125. The inner felloes are indicated by 125(I) and the outer felloes are indicated by 125(O).

Each felloe portion 125 has a predetermined mounting location indicated generally at 126 for the axially projecting component of a fastening means or assembly 122. As shown, the axially projecting component attached to the felloe portion 125 at a mounting location 126 is an elongated stud 127 having an inner end with peripheral threads 128 for mating engagement with bore threads 129. Alternatively, the studs 127 may be attached to the felloe portions 125 at a mounting location 126 as by a conventional arc stud or capacitor-discharge welds.

The wheel felloe portions 125(I) have outwardly facing dual axially oriented surfaces 135 extending substantially parallel to the rotational axis of the wheel 120. Each surface 135 intersects a radially inclined surface 136, extending outwardly away from a surface 135 at a suitable angle. A radially directed surface 137 extends inwardly away from and between each surface 135, preferably substantially perpendicular to the rotational axis of the wheel 120. Each surface 137 has a mounting location 126 for the axially projecting component 127 of a fastening means 122.

The wheel felloe portions 125(O) have dual axially oriented surfaces 138 extending substantially parallel to the rotational axis of the wheel. Each surface 138 intersects a radially directed surface 139. A surface 139 is oriented transversely to and between the surfaces 138, preferably substantially perpendicular to the rotational axis of the wheel 20. Each surface 139 has a mounting location 126 for the axially projecting component of a fastening assembly 122. Each wheel felloe portion 125(O) has spaced-apart axially projecting wing portions 141 providing for outwardly facing dual axially oriented surfaces 138.

The axially oriented surfaces 135 and 138 on each spoke member 123 have the same or identical diameter as measured from the rotational axis of the wheel 120.

A dual rim wheel 120 preferably has ten alternating spoke members 123 with an axially spaced-apart and staggered relation to an adjacent spoke member.

The inner and outer spoke members 123 may be interconnected by web members 143.

The fastening assemblies 122 for locking the inner rim 21 on the felloe portions 25(I), with the rim surface 40 in mating engagement with the axially oriented felloe surfaces 135 and the clamp lug leg portions 46 in mating or full surface engagement with the radially directed felloe surfaces 137, have a rotatable nut 153 carried on the stud 127.

The fastening assemblies 122 for locking the outer rim 21 on the felloe portions 125(O), with the rim surface 40 in mating engagement with the axially oriented felloe surfaces 138 and the clamp lug leg portions 46 in mating or full surface engagement with the radially directed felloe surfaces 139, include an elongated stud 127, a rotatable nut 153 and a clamp element 154. A clamp element 154 has a bore 155 for receiving the stud 127. Although not shown, a clamp element 154 may also have an axially inwardly directed lower leg portion, substantially equivalent to the element identified by the numeral 68 on the clamp element 64 as shown in FIG. 1, for mating engagement against a clamp lug lower leg portion 46. A clamp element 154 will also have lateral wing portions 156 providing for downwardly facing dual axially oriented surfaces 157 for seating on conforming wheel felloe surfaces 138. The radially outer portion of a clamp element has a radially inclined surface 158 for mating engagement with a conforming rim surface 39. The clamp element 154 may also have an inwardly directed lower leg portion which is axially extended, in the manner of a clamp element lower leg portion 68 as shown in FIG. 1, for mating engagement against a clamp lug leg portion 46.

Referring to FIG. 2, a rim 21 may have a clamp lug 45 which is an annular or circumferentially continuous element. In this form, a clamp lug would have the leg portions 46 with the bores 47 therethrough at spaced intervals conforming to the spacing of the spoke members 23.

What is claimed is:

1. A combination of dual inner and outer tire carrying rims mounted on a vehicle wheel, said outer rim being seated and locked on said wheel by fastening assemblies, said wheel having a plurality of inner and outer spoke members, each said outer spoke member having a felloe comprising spaced-apart axially projecting wing portions providing outwardly facing dual axially oriented surfaces and a radially directed surface extending inwardly between said axially oriented surfaces substantially perpendicular to the rotational axis of said wheel and providing a mounting location for an axially projecting component of said fastening assemblies, said outer rim having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of said outer rim with a bore therein for receiving said axially projecting component of said fastening assemblies, each said fastening assembly comprising a threaded fastener and a clamp element supported on said threaded fastener, each said clamp element having lateral wing portions providing downwardly facing dual axially oriented surfaces and a radially outer portion with a radially inclined surface, whereby, said outer rim is seated on, and thereafter locked on, said outer spoke members by tightening of said fastening assemblies and the mating engagement of said radially directed surface on each said outer spoke felloe with said radially directed leg portion on each said clamp lug, and by the mating engagement of said axially oriented radially inner surface on said outer rim base edge portion with said outwardly facing dual axially oriented surfaces on each said outer spoke felloe, and by the mating engagement of said radially inclined surface on each said clamp element on each said fastening assembly with said radially inclined axially inner surface on said outer rim base edge portion, said downwardly facing dual axially oriented surfaces on said lateral wing portions of each clamp element on each said fastening assembly being in mating engagement with said outwardly facing dual axially oriented surfaces on each said outer spoke felloe.

2. A combination of dual inner and outer tire carrying rims seated and locked by fastening assemblies on a vehicle wheel, said wheel having a plurality of inner and outer spoke members, each of said inner spoke members having a felloe comprising axially oriented and radially inclined surfaces and a radially inwardly directed surface extending inwardly from each of said axially oriented surfaces substantially perpendicular to the rotational axis of said wheel and providing a mounting location for an axially projecting component of inner rim fastening assemblies, each of said outer spoke members having a felloe comprising spaced-apart axially projecting wing portions providing outwardly facing dual axially oriented surfaces and a radially directed surface oriented transversely between said axially oriented surfaces substantially perpendicular to the rotational axis of said wheel and providing a mounting location for an axially projecting component of outer rim fastening assemblies, each of said rims having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of each of said rims with a bore therein for receiving said axially projecting component of said fastening assemblies, each said outer rim fastening assembly comprising a threaded fastener and a clamp element supported by said threaded fastener, each said clamp element having lateral wing portions providing downwardly facing dual axially oriented surfaces and a radially outer portion with a radially inclined surface, whereby, said inner rim is seated on, and thereafter locked on, said inner spoke members by tightening of said inner rim fastening assemblies and the mating engagement of said axially oriented and radially inclined surfaces on each said inner spoke felloe with said axially oriented radially inner and radially inclined axially inner surfaces on said inner rim base edge portion and by the mating engagement of said radially inwardly directed surface on each said inner spoke felloe with said radially inwardly directed leg portion of each said inner rim clamp lug, and, whereby, said outer rim is seated on, and thereafter locked on, said outer spoke members by tightening of said outer rim fastening assemblies and the mating engagement of said radially directed surface on each said outer spoke felloe with said radially inwardly directed leg portion on each said outer rim clamp lug, and by the mating engagement of said radially inclined axially inner surface on said outer rim base edge portion with said radially inclined surface on said radially outer portion of each said clamp element of each said outer rim fastening assembly, said downwardly facing dual axially oriented surfaces on said lateral wing portions of each said clamp element being in mating engagement with said outwardly facing dual axially oriented surfaces on each said outer spoke felloe.

3. A combination of dual inner and outer tire carrying rims mounted on a vehicle wheel, said outer rim being seated and locked on said wheel by fastening assemblies, said wheel having a plurality of inner and outer spoke members, each said outer spoke member having a felloe comprising spaced-apart axially projecting wing portions providing outwardly facing dual axially oriented surfaces and a radially directed surface extending inwardly between said axially oriented surfaces substantially perpendicular to the rotational axis of said wheel and providing a mounting location for an axially projecting component of said fastening assemblies, said outer rim having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of said outer rim with a bore therein for receiving said axially projecting component of said fastening assemblies, each said fastening assembly comprising a threaded fastener and a clamp element supported on said threaded fastener, each said clamp element having lateral wing portions providing downwardly facing dual axially oriented surfaces, an axially inwardly directed member, and a radially outer portion with a radially inclined surface intersecting an axially oriented surface, whereby, said outer rim is seated on, and thereafter locked on, said outer spoke members by tightening of said fastening assemblies and the mating engagement of said radially directed surface on each said outer spoke felloe with said radially directed leg portion on each said clamp lug, and by the mating engagement of said radially inclined and axially oriented surfaces on each said clamp element on each said fastening assembly with said radially inclined axially inner and axially oriented radially inner surfaces on said outer rim base edge portion, said downwardly facing dual axially oriented surfaces on said lateral wing portions of each clamp element on each said fastening assembly being in mating engagement with said outwardly facing dual axially oriented surfaces on each said outer spoke member and said axially inwardly directed member of each said clamp element on each said fastening assembly being in mating engagement with said radially directed leg portion on each said clamp lug.

* * * * *